United States Patent [19]

Tanaka et al.

[11] Patent Number: 4,589,941
[45] Date of Patent: May 20, 1986

[54] METHOD OF FABRICATING DOUBLE-TOOTHED BELTS

[75] Inventors: Toshihiro Tanaka; Keiichi Yoshimi, both of Kobe; Shigeo Goto, Himeji, all of Japan

[73] Assignee: Mitsuboshi Belting Ltd., Kobe, Japan

[21] Appl. No.: 696,631

[22] Filed: Jan. 30, 1985

[30] Foreign Application Priority Data

Jan. 30, 1984 [JP] Japan .................................. 59-16400

[51] Int. Cl.⁴ ........................ B29H 1/22; B32B 31/06
[52] U.S. Cl. .................................. 156/140; 156/153; 156/245; 264/162; 264/255; 264/263; 264/296; 264/326
[58] Field of Search ............... 156/137, 140, 141, 153, 156/154, 311, 245; 264/296, 294, 254, 253, 325, 326, 263, 162; 425/28 B, 34 B, 339; 474/205, 250, 251

[56] References Cited

U.S. PATENT DOCUMENTS

| | | | |
|---|---|---|---|
| 2,867,845 | 1/1959 | Sauer | 425/339 |
| 3,673,883 | 7/1972 | Adams | 156/140 |
| 3,860,684 | 1/1975 | Vance, Sr. | 156/140 |
| 3,897,291 | 7/1975 | Hoback et al. | 425/28 B |
| 4,359,355 | 11/1982 | Stecklein et al. | 264/294 |
| 4,369,160 | 1/1983 | Esidi et al. | 425/339 |
| 4,414,047 | 11/1983 | Wetzel et al. | 474/251 |

Primary Examiner—Michael Ball
Attorney, Agent, or Firm—Wood, Dalton, Phillips, Mason & Rowe

[57] ABSTRACT

A method of forming a double timing belt wherein a belt preform is firstly formed with teeth on one face thereof. The opposite face of the belt in which the tensile cord is embedded is provided with oppositely projecting teeth in accurate alignment with the teeth of the preform by a successive molding of pluralities of such teeth to the opposite face, with the preform entrained about a pair of adjustably spaced toothed pulleys. Accurate uniform pitch line difference is maintained by providing shims between the mold and belt support during the molding of the second set of teeth to the preform. The mold and support are retained in accurate alignment by cooperating dowels and recesses on the support and mold members. Cooling devices are provided at opposite ends of the mold for preventing full vulcanization of the tooth rubber thereat.

21 Claims, 7 Drawing Figures

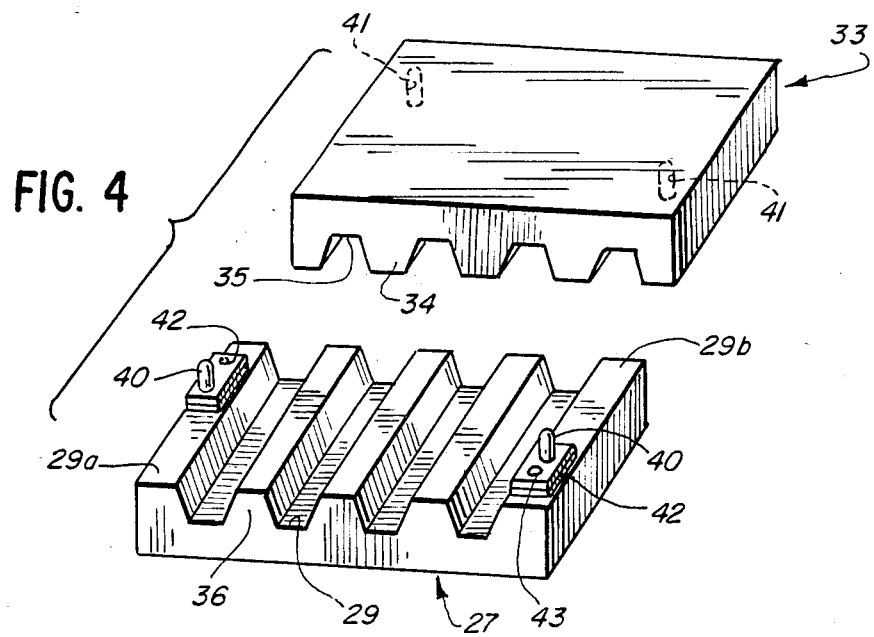
FIG. 4
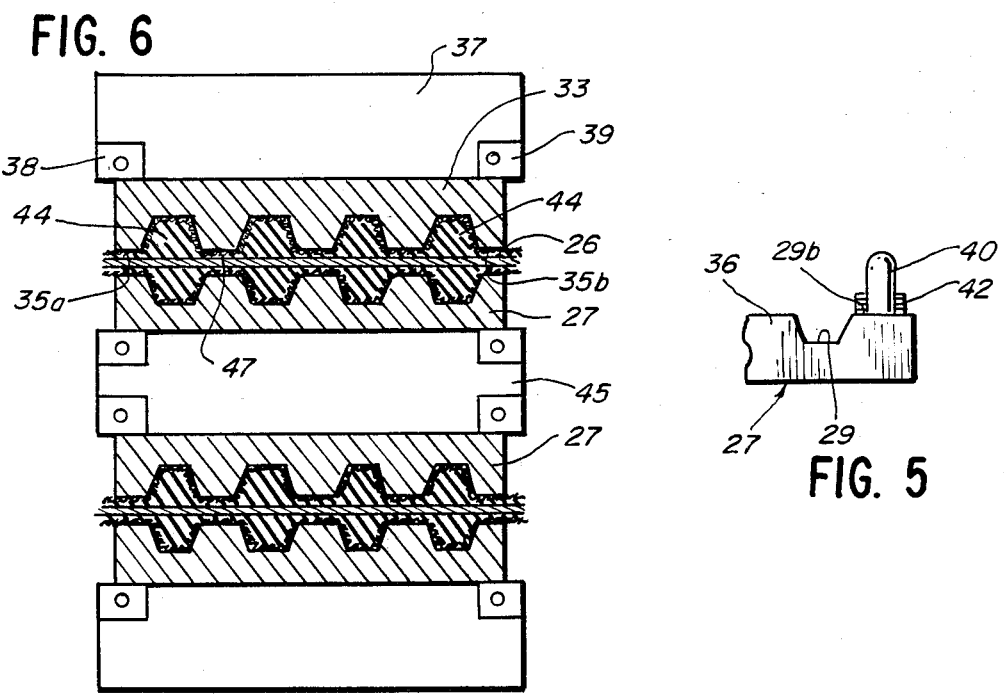
FIG. 5
FIG. 6
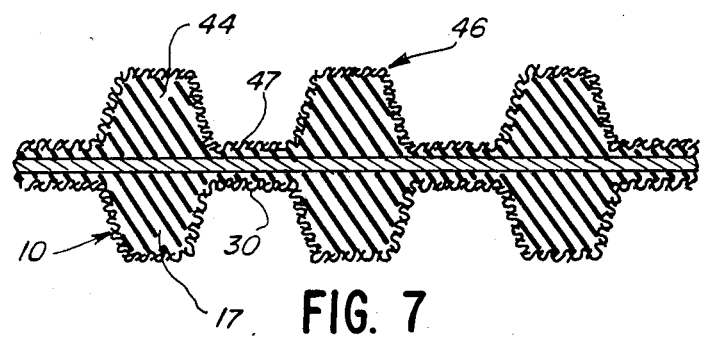
FIG. 7

METHOD OF FABRICATING DOUBLE-TOOTHED BELTS

TECHNICAL FIELD

This invention relates to the forming of toothed belts, and in particular to the forming of double-toothed belts, such as timing belts, wherein teeth are provided on the opposite faces of the belt.

BACKGROUND ART

One form of timing belt utilizes a looped belt body provided with a plurality of longitudinally spaced teeth for maintaining accurate relationship between toothed pulleys engaged with the teeth at different portions of the system.

In one form of timing belt, teeth are provided on both the upper and lower surface of the belt.

One such double-toothed belt is illustrated in Japanese Patent Publication No. 22,101/1971. As shown therein, the belt is formed by sequentially winding on a mold a canvas layer, a tensile rope, a nonvulcanized rubber layer, and a second canvas layer. The layers are wound about a mold provided with grooves corresponding to the desired teeth of the belt. A basic mold of rubber having cylindrical grooves is applied to the outer surface of the laminate and pressure vulcanizing thereof is effected so as to extrude the rubber into the grooves of both the inner and outer molds, thereby forming the desired upper and lower teeth.

Another method utilized in the background art is disclosed in the laid open Japanese Patent Application 135056/1974. As disclosed therein, a number of rubber sheets are molded to the spirally wound tensile cords. The method shown therein is similar to the method of Japanese Patent No. 22101, in that each utilizes basic molds to mold the upper and lower teeth, whereby the positions of the upper and lower teeth may be displaced. Not only is there the possibility of providing an irregular array of the teeth, but also it is extremely difficult to equalize the pitch line difference of the upper and lower teeth.

DISCLOSURE OF INVENTION

The present invention comprehends an improved method of forming double-toothed timing belts wherein high accuracy of the arrangement of the teeth on the opposite faces of the belt is obtained.

The invention further permits high accuracy in equalizing the pitch line difference of both the upper and lower teeth.

The novel method of the present invention is extremely simple and economical while yet providing the highly improved timing belt structure discussed above.

More specifically, the invention comprehends the method of forming a double timing belt including the steps of (a) forming a continuously looped timing belt preform having cog teeth disposed seriatim in one longitudinal face thereof, (b) forming in situ on the face of the belt preform opposite the one face at a first portion of the belt surface a plurality of cog teeth aligned accurately with the cog teeth on the one face, and repeating the step (b) on at least one successive opposite face portion of the belt preform until the entire length of the belt preform is provided with cog teeth on the opposite face aligned accurately correspondingly with the cog teeth in the one face.

The preform, in the illustrated embodiment, is formed about a peripherally grooved cylindrical mold.

In the illustrated embodiment, the step of forming in situ on the opposite face of the belt the discrete quantities of cog teeth comprises a step of forming such pluralities at spaced portions of the belt preform concurrently.

In carrying out the manufacture, the preform is advanced seriatim to a preselected location wherein the individual plurality of teeth are successively formed.

In the illustrated embodiment, the opposite face of the preform is polished prior to the forming of the opposite teeth thereon.

A bonding agent may be utilized in securing the second set of teeth to the opposite face of the preform.

More specifically, the invention comprehends the improved method of forming a double timing belt including the steps of (a) forming a continuously looped timing belt preform having cog teeth disposed seriatim on one longitudinal face thereof, (b) wrapping longitudinally about the looped preform opposite face a stretchable fabric layer, (c) inserting between the fabric layer and the preform opposite face an insert of unvulcanized rubber having a length longitudinally of the preform corresponding to a preselected group of teeth of the preform, (d) causing the rubber insert to form vulcanized teeth bonded to the opposite face in accurate alignment with the group of teeth of the preform, and (e) repeating steps (c) and (d) at successively different portions of the preform to provide teeth on the opposite surface along the entire longitudinal extent aligned with the teeth of the preform.

The invention comprehends providing cooling means at opposite ends of the insert for preventing vulcanization thereof as an incident of forming of the vulcanized teeth.

In the illustrated embodiment, the preform is cooled adjacent the insert during the tooth-forming step.

The invention comprehends that the forming step be effected by supporting the portion of the preform defining the group of teeth on a support in urging a heated grooved mold against the fabric and underlying insert toward the support, whereby the fabric is stretched to conform to the grooved mold by the pressure developed in the unvulcanized insert rubber prior to vulcanization thereof in forming the teeth on the opposite face of the preform.

The invention further comprehends maintaining accurate spacing between the support and mold by means of spacers.

In the illustrated embodiment, the mold is accurately positioned relative to the support by cooperating guide means in the form of pin and recess means.

In the illustrated embodiment, the spacers are associated with the pin means.

The improved method of forming a double timing belt of the invention is extremely simple and economical while yet providing highly accurate alignment of the teeth at opposite sides of the belt, and highly accurate and uniform pitch line difference.

BRIEF DESCRIPTION OF THE DRAWING

Other features and advantages of the invention will be apparent from the following description taken in connection with the accompanying drawing wherein:

FIG. 4 is a perspective view illustrating the configuration of the support and mold for forming the opposite teeth;

FIG. 5 is a fragmentary enlarged elevation illustrating the alignment and spacing means thereof;

FIG. 6 is a vertical section illustrating a modified form of the invention utilizing cooling means for cooling the support means during the tooth-forming step; and FIG. 7 is a fragmentary longitudinal section illustrating the double timing belt formed by the disclosed method.

BEST MODE FOR CARRYING OUT THE INVENTION

Figure 1:
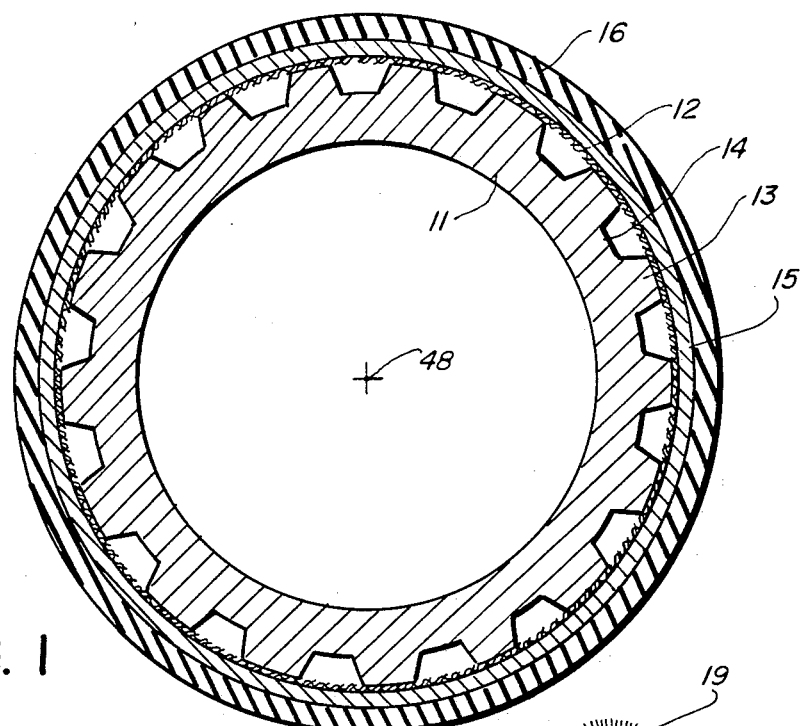
FIG. 1 is a transverse section of a cylindrical mold showing an intermediate step in the forming of the timing belt preform.

In the exemplary embodiment of the invention as disclosed in the drawing, a timing belt preform generally designated 10 is prepared on a cylindrical mold 11. The preform illustratively is formed in the conventional manner by wrapping stretchable canvas 12 about the circumference of the mold, as shown in FIG. 1. The mold includes projecting teeth 13 and intermediate grooves 14.

A suitable tensile cord, or rope, 15 is spirally wound around the fabric 12 on the mold. The tensile cord is formed of conventional low elongation, high tensile strength cord material, such as glass fiber, KEVLAR aromatic polyamide resin, polyester fibers, steel, etc. The tensile cord is wound under a predetermined tension.

An unvulcanized rubber sheet 16 is then wrapped in overlying relationship to the tensile cord.

Figure 2:
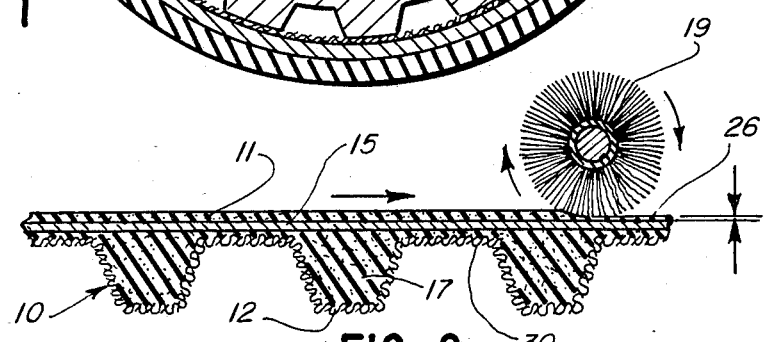
FIG. 2 is a fragmentary enlarged longitudinal section illustrating the step of polishing the preform to provide a preselected thickness of rubber overlying the tensile cords.

The assembled fabric 12, tensile cord 15, and rubber layer 16 are formed into the preform 10 by providing an outer mold (not shown) and introducing steam at a pressure of approximately 7 to 8 kg/mm2 in the outer mold to act against the rubber 16 urging it inwardly in a fluidized state as a result of the high temperature of the steam. The rubber thusly flows between the turns of the tensile cord into the grooves 14, carrying with it the stretchable canvas 12 and effect vulcanization of the rubber so as to form the preform configuration of FIG. 2. Thus, as seen in FIG. 2, the preform is defined by a plurality of longitudinally spaced teeth 17 covered by the canvas fabric 12. A thin layer 18 of vulcanized rubber remains outwardly of the tensile cord 15.

The rubber layer 18 is preferably reduced in thickness to less than 0.2 mm as by a suitable tool 19, which illustratively may comprise a grinder or wire brush, while at the same time providing a relatively rough bonding surface 26 on the rubber layer.

Preform 10 is extended about a pair of pulleys 20 and 21, with the teeth 17 of the preform being received in complementary grooves 22 of the pulleys. The spacing between the axes 23 and 24 of the pulleys is adjustable so as to cause the preform to be extended between the pulleys, as shown in FIG. 3.

Figure 3:
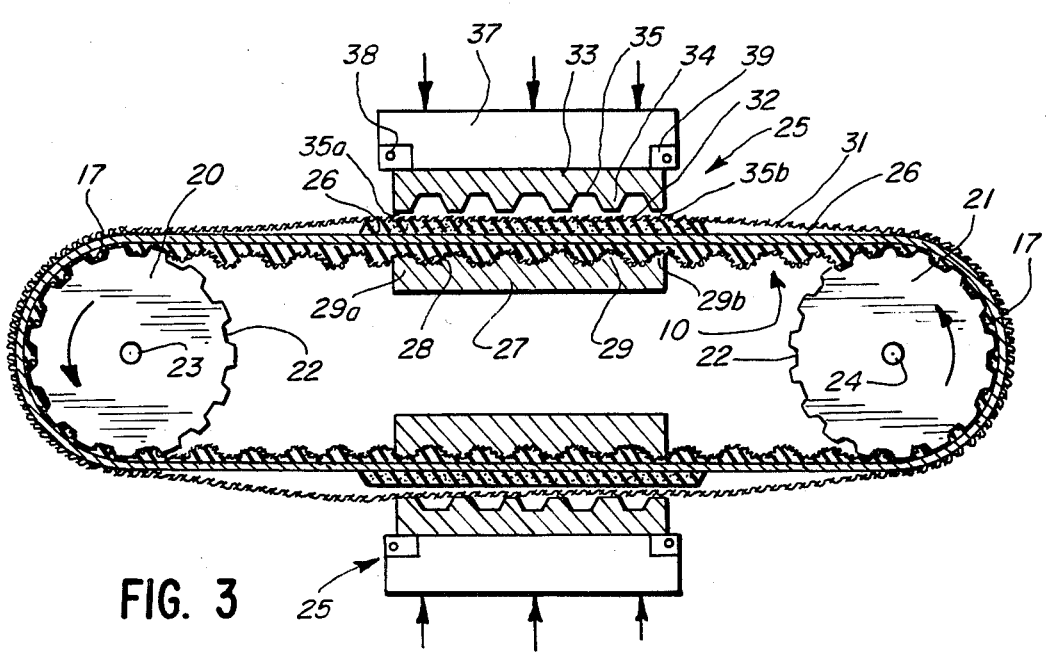
FIG. 3 is a longitudinal section illustrating a further step in utilizing the preform in forming the double-toothed timing belt by means of cooperating support and mold for seriatim forming teeth on the opposite face of the preform.

As further illustrated in FIG. 3, a pair of forming devices generally designated 25 are provided for use in forming teeth on the outer bonding surface surface 26 of the preform. As shown in FIG. 3, the devices 25 are opposed so as to form a plurality of such outer teeth at opposite portions of the preform entrained about the pulleys 21. As each of the devices 25 is similar, description thereof will be limited to the upper device illustrated in FIG. 3, it being understood that the description applies equally to the lower device.

More specifically, device 25 includes a support 27 having a plurality of spaced grooves 28 complementary to the formed teeth 17 and in which a corresponding plurality of the formed teeth are removably disposed, as shown in FIG. 3. The lands 29 between the grooves correspond to the lands 30 between the teeth 17 of the preform. The support defines such a land at each of the opposite ends of the series of grooves 28 identified in FIG. 3 as lands 29a and 29b, respectively.

An outer fabric cover 31 of stretchable canvas is wrapped about the preform extending about the pulleys 20 and 21, as seen in FIG. 3. The spacing between the pulley axes 23 and 24 is adjusted so as to permit the coating of a suitable bonding agent on the rubber surface 26 outwardly of the support 27 and the insertion of a body of unvulcanized rubber sheeting 32 between the fabric 31 and the coated surface.

An outer mold 33 is juxtaposed to support 27 and is provided with teeth 34 separated by lands 35 complementary to the teeth 36 and lands 29 of support 27. Mold 33 is associated with a heating plate 37 having, at its opposite ends, cooling elements 38 and 39, respectively.

As shown in FIG. 4, support 27 is provided with a plurality of guide pins 40 upstanding from the end lands 29a and 29b, respectively, and adapted to mate with recesses 41 in the mold 33. A suitable plurality of shims 42 are received by the pins 40 and secured to the support by suitable screws 43 for providing a uniform pitch line difference (PLD).

As illustrated in FIG. 6, an outer set of teeth 44 are formed on the preform, and more specifically, bonded to the preform outer surface 26 as a result of the mold 33 being brought toward support 27 while being heated by heating element 37. This causes extrusion of the rubber material 32 and stretching of the fabric 31 into the mold 33, as shown in FIG. 6. The molding operation is continued until the rubber is suitably vulcanized. The cooling elements 38 and 39 prevent complete vulcanization of rubber which may be extruded outwardly past the outermost lands 35a and 35b, respectively.

Upon completion of the setting of the plurality of outer teeth 44 in mold 33, the mold is removed from the formed teeth, permitting the preform belt to be advanced on pulleys 20 and 21, as in the direction of the arrows illustrated in FIG. 3, so as to bring the next successive portion of the belt between the spaced mold and support, permitting a new body of bonding material to be applied to the preform outer surface 26 and a subsequent sheet of unvulcanized rubber 32 to be inserted to form a next succeeding group of teeth 44 on the outer surface of the preform belt.

These steps are continued until all of the outer teeth are formed on the outer surface of the belt by the successive forming of the indicated plurality of teeth 44 in the mold 33. As pointed out previously, as a result of there being two such molding devices 25, molding of the outer teeth is completed when the first plurality of teeth molded in the lower molding device 25 reach the righthand end of the upper molding device 25.

As the dowel pins 40 cooperating with the recesses 41 assure an accurate alignment of the teeth and lands of the mold with the teeth and lands of the support, an accurate conformation of the inner and outer teeth on the double timing belt is automatically assured by the novel process of the invention. If desired, a cooling plate 45 may be provided between the supports 27, as shown in FIG. 6, for further assuring only incomplete vulcanization of the rubber outboard of the end teeth 44 adjacent lands 35a and 35b.

A longitudinal section of a portion of the final double-toothed belt generally designated 46 is illustrated in FIG. 7. As shown therein, the outer teeth 44 are accurately aligned with the inner teeth 17 of the preform 10. The interval between the centerline of the belt and the bottom of the valleys of the inner and outer teeth, i.e. lands 30 and 47, respectively, is caused to be highly uniform and accurate by the control afforded by shims 42. The use of shims of different thickness is comprehended within the scope of the invention. Illustratively, a first shim having a thickness of 2 to 3 mm. and additional shims having thickness of approximately 0.5 mm. may be utilized in providing the accurate thickness control.

The heating element 37 may utilize any suitable heating means, such as steam, electricity, etc.

The width of the formed belt 46 (i.e. in the direction of the axis 48 of the original mandrel 11) may be sufficient to provide a plurality of conventional width double-toothed belts. Separation of the belt 46 into the individual belts may be effected by any suitable means, such as knives (not shown) for slitting the belt 46 lengthwise into the desired number of double-toothed V-belts.

By utilizing the axially adjustable pulleys 20 and 21, simplified control of the manufacturing operation is effected. In the illustrated embodiment, only a thin layer of rubber is left at surface 26. By treating the rubber with a wire brush 19, or the like, the surface is relatively rough, thereby providing improved bonding of the outer teeth 44 thereto, while at the same time maintaining the strength of the tensile cord in the belt.

The foregoing disclosure of specific embodiments is illustrative of the broad inventive concepts comprehended by the invention.

We claim:

1. The method of forming a double timing belt, comprising the steps of:
    (a) forming a continuously looped timing belt preform having cog teeth disposed seriatim in one longitudinal face thereof;
    (b) causing the face of the belt preform opposite said one face to define a rough bonding surface;
    (c) applying an unvulcanized rubber insert without teeth on said bonding surface at a first portion of the belt surface and closing a mold to form a plurality of cog teeth in said insert aligned accurately with the cog teeth in said one face, and opening the mold; and
    (d) repeating step (c) on at least one successive opposite bonding surface portion of the belt preform until the entire length of the V-belt preform is provided with cog teeth said opposite face aligned accurately correspondingly with the cog teeth in said one face.

2. The method of forming a double timing belt of claim 1 wherein said steps (a) comprises a step of forming the belt preform about a periphally longitudinally grooved cylindrical mold.

3. The method of forming a double timing belt of claim 1 wherein step (c) is concurrently performed on a plurality of spaced portions of the belt preform.

4. The method of forming a double timing belt of claim 1 wherein step (c) is performed at a preselected location, and the belt preform is advanced seriatim to said location between each of the successive repeats of step (c) in effecting step (d).

5. The method of forming a double timing belt of claim 1 wherein said step of causing said opposite face of the belt preform to define a rough bonding surface comprises a step of mechanically roughing said surface.

6. The method of forming a double timing belt of claim 1 wherein said step (b) of causing said opposite face of the belt preform to define a rough bonding surface comprises a step of mechanically roughing said surface and said method further includes a step of providing a bonding agent on said body surface prior to effecting step (c).

7. The method of forming a double timing belt of claim 1 wherein said belt preform includes longitudinal tensile cords adjacent said opposite surface and said method includes a step of causing the opposite surface to be spaced outwardly of said tensile cords a preselected distance.

8. The method of forming a double timing belt of claim 1 wherein said belt preform includes longitudinal tensile cords adjacent said opposite surface and said method includes a step of causing the opposite surface to be spaced outwardly of said tensile cords a small preselected distance.

9. The method of forming a double timing belt of claim 1 wherein cooling means are provided at the opposite ends of said plurality of teeth.

10. The method of forming a double timing belt, comprising the steps of:
    (a) forming a continuously looped timing belt preform having cog teeth disposed seriatim in one longitudinal face thereof;
    (b) wrapping longitudinally about said looped preform opposite face a stretchable fabric layer;
    (c) inserting between said fabric layer and said preform opposite face an insert of unvulcanized rubber without teeth having a length longitudinally of the preform corresponding to a preselected group of teeth of said preform;
    (d) closing a tooth mold to cause said rubber insert to form vulcanized teeth bonded to said opposite face in accurate alignment with said group of teeth of said preform, and opening the mold; and
    (e) repeating said steps (c) and (d) at successively different portions of the preform to provide teeth on said opposite surface along the entire longitudinal extent aligned with said teeth of the preform.

11. The method of forming a double timing belt of claim 10 wherein cooling means are provided at opposite ends of said insert for preventing vulcanization of any unvulcanized rubber of the insert which may be urged longitudinally thereto as an incident of the forming of the vulcanized teeth from said insert in effecting steps (d).

12. The method of forming a double timing belt of claim 10 wherein said preform is further cooled adjacent said insert during said steps (d).

13. The method of forming a double timing belt of claim 10 wherein said forming step (d) is effected by supporting the portion of the preform defining the group of the teeth on a support and urging a heated grooved mold against the fabric and underlying insert toward the support, the fabric being stretched to conform to the grooved mold by pressure developed in the unvulcanized insert rubber prior to vulcanization thereof in forming the teeth in said opposite face.

14. The method of forming a double timing belt of claim 10 wherein said forming step (d) is effected by supporting the portion of the preform defining the group of the teeth on a support and urging a heated grooved mold against the fabric and underlying insert toward the support, the fabric being stretched to conform to the grooved mold by pressure developed in the unvulcanized insert rubber prior to vulcanization thereof in forming the teeth in said opposite face, and means are provided at the opposite ends of the mold for preventing vulcanization of rubber extruded from the insert by said pressure.

15. The method of forming a double timing belt of claim 10 wherein said forming step (d) is effected by supporting the portion of the preform defining the group of the teeth on a support and urging a heated grooved mold against the fabric and underlying insert toward the support, the fabric being stretched to conform to the grooved mold by pressure developed in the unvulcanized insert rubber prior to vulcanization thereof in forming the teeth in said opposite face, and cooling means are provided at the opposite ends of the mold for preventing vulcanization of rubber extruded from the insert by said pressure.

16. The method of forming a double timing belt of claim 10 wherein said forming step (d) is effected by supporting the portion of the preform defining the group of the teeth on a support and urging a heated groove mold against the fabric and underlying insert toward the support, the fabric being stretched to conform to the grooved mold by pressure developed in the unvulcanized insert rubber prior to vulcanization thereof in forming the teeth in said opposite face, said support being cooled during said forming step (d).

17. The method of forming a double timing belt of claim 10 wherein said forming step (d) is effected by supporting the portion of the preform defining the group of the teeth on a support and urging a heated grooved mold against the fabric and underlying insert toward the support, the fabric being stretched to conform to the grooved mold by pressure developed in the unvulcanized insert rubber prior to vulcanization thereof in forming the teeth in said opposite face, said method further including the step of providing spacer means between said support and mold for accurately spacing the support and mold during the forming step (d) to provide an accurate pitch line difference relative to both said teeth of the preform and said teeth formed in said opposite surface.

18. The method of forming a double timing belt of claim 10 wherein said forming step (d) is effected by supporting the portion of the preform defining the group of the teeth on a support and urging a heated grooved mold against the fabric and underlying insert toward the support, the fabric being stretched to conform to the grooved mold by pressure developed in the unvulcanized insert rubber prior to vulcanization thereof in forming the teeth in said opposite face, said method further including the step of guiding said mold into accurate registry with said support in effecting said forming step (d).

19. The method of forming a double timing belt of claim 10 wherein said forming step (d) is effected by supporting the portion of the preform defining the group of the teeth on a support and urging a heated grooved mold against the fabric and underlying insert toward the support, the fabric being stretched to conform to the grooved mold by pressure developed in the unvulcanized insert rubber prior to vulcanization thereof in forming the teeth in said opposite face, said method further including the step of guiding said mold into accurate registry with said support in effecting said forming step (d) by means of guide pins on one of the support and mold and complementary recess means on the other thereof.

20. The method of forming a double timing belt of claim 10 wherein said forming step (d) is effected by supporting the portion of the preform defining the group of the teeth on a support and urging a heated grooved mold against the fabric and underlying insert toward the support, the fabric being stretched to conform to the grooved mold by pressure developed in the unvulcanized insert rubber prior to vulcanization thereof in forming the teeth in said opposite face, said method further including the step of guiding said mold into accurate registry with said support in effecting said forming step (d) by means of guide pins on one of the support and mold and complementary recess means on the other thereof, said method further including the step of providing spacer means between said support and mold for accurately spacing the support and mold during the forming step (d) to provide an accurate pitch line difference relative to both said teeth of the preform and said teeth formed in said opposite surface, said spacer means comprising elements associated with said guide pins.

21. A method of fabricating a double timing belt comprising the steps of:
(a) winding a stretchable canvas with rubber along the outer peripheral surface of a cylindrical toothed mold alternately forward with a plurality of projecting strips and grooves in an axial direction on the outer surface, spirally winding tensile ropes of low elongation and high tensile strength on said canvas, further winding unvulcanized rubber sheet of predetermined thickness on said tensile ropes, engaging a cylindrical sleeve on the outer periphery of the unvulcanized molded belt thus obtained, heating and pressurizing to urge under pressure the rubber sheet in the grooves to form teeth from and to obtain vulcanized toothed molded belt integrated with the roped layer, the toothed rubber layer and the canvas layer;
(b) removing the vulcanized toothed molded belt from the mold, removing the back surface rubber layer covered on the upper surface of the ropes to cause the rubber overlying the ropes to have a thickness below 0.2 mm and a rough bonding surface;
(c) engaging the belt on two toothed pulleys adjustable at an interval between the pulley;s
(d) alternately forming a plurality of projecting strips and grooves laterally at a predetermined interval;
(e) engaging the lower and upper racks of a pair of pressing molds having upper racks formed with pin inserting holes at both ends thereof and lower racks formed with knock pins at both ends with the toothed pulleys;

(f) coating bonding agent on said bonding surface of the vulcanized toothed molded belt;

(g) sequentially bonding unvulcanized rubber sheet without teeth of predetermined thickness and length, endless or ended stretchable canvases of predetermined thickness and length on said back surface;

(h) engaging the upper and lower racks facing oppositely with each other on the upper and lower surfaces of the lower and upper racks to be engaged with the toothed part through a plurality of thickness-regulating plates via the knock pins and the pin holes;

(i) holding and pressuring the upper and lower racks from above and below by a heating press at the unvulcanized laminate, thereby vulcanizing and molding upper teeth;

(j) removing the pressing molds after vulcanizing from the vulcanized toothed molded belt; and (k) moving the position of the vulcanized toothed molded belt, performing sequentially repeatedly the steps of (d) and (j) at the unmolded upper toothed part, thereafter further repeating the steps.

* * * * *